(12) United States Patent
Knezevic et al.

(10) Patent No.: US 9,060,637 B2
(45) Date of Patent: Jun. 23, 2015

(54) ONION PEELING DEVICE

(75) Inventors: Nikola Knezevic, Marsta (SE); Mikael Ericsson, Hagersten (SE); Daniel Ericsson, Stockholm (SE); Johan Vestberg, Stockholm (SE)

(73) Assignee: EPU AG, Hergiswil (CH)

( * ) Notice: Subject to any disclaimer, the term of this patent is extended or adjusted under 35 U.S.C. 154(b) by 353 days.

(21) Appl. No.: 13/520,925

(22) PCT Filed: Feb. 8, 2011

(86) PCT No.: PCT/SE2011/050143
§ 371 (c)(1),
(2), (4) Date: Jul. 6, 2012

(87) PCT Pub. No.: WO2011/099927
PCT Pub. Date: Aug. 18, 2011

(65) Prior Publication Data
US 2012/0318151 A1   Dec. 20, 2012

(30) Foreign Application Priority Data
Feb. 11, 2010   (SE) ....................................... 1050139

(51) Int. Cl.
A23N 7/00 (2006.01)
A47J 17/02 (2006.01)
A47J 17/18 (2006.01)
A23N 7/02 (2006.01)

(52) U.S. Cl.
CPC . *A47J 17/02* (2013.01); *A23N 7/00* (2013.01); *A47J 17/18* (2013.01); *A23N 7/026* (2013.01)

(58) Field of Classification Search
CPC ......... A23N 15/08; A23N 7/00; A23N 7/023; A23N 7/026; A47J 17/14; A47J 17/18; A47J 17/02
USPC ............................. 99/588, 590, 596, 587, 599
See application file for complete search history.

(56) References Cited

U.S. PATENT DOCUMENTS

| | | | |
|---|---|---|---|
| 4,545,297 A | 10/1985 | Ihlow | |
| 4,738,195 A * | 4/1988 | Berube et al. | 99/591 |
| 4,998,466 A * | 3/1991 | Nagaoka | 99/591 |
| 5,142,973 A | 9/1992 | Tur et al. | |
| 6,718,868 B2 * | 4/2004 | Ismail et al. | 99/584 |

FOREIGN PATENT DOCUMENTS

| | | |
|---|---|---|
| CA | 2 256 795 A1 | 7/2000 |
| DE | 196 43 795 A1 | 5/1998 |

* cited by examiner

*Primary Examiner* — Reginald L Alexander
(74) *Attorney, Agent, or Firm* — Dickstein Shapiro LLP

(57) ABSTRACT

The invention relates to an onion peeler comprising a first part (1, 1') adapted to hold an onion (4) and at least one second part (2, 2') comprising a frame on which first and/or second arms (7a, 7b; 8a, 8b) are arranged around an opening (6, 6'). First free ends (7a1, 7b1; 8a1, 8b1) of the arms are pointing towards a center axis (a1) of the opening (6, 6') and are radially moveable with respect to the center axis (a1) of the opening. At least two of the first arms (7a, 7b) are provided with vertically arranged cutting means (10) and at least two of the second arms (8a, 8b) are provided with peeling means (12). The invention is characterized in that the cutting means (10) protrudes from the first end (7a1, 7b1) of the respective first arm (7a, 7b) at least in a direction of an extension of the respective first arm (7a, 7b) and is provided with at least one cutting edge (11) wherein the cutting means (10) have at least partly a disc shape with a diameter (d2) and wherein its perimeter is acting as cutting edge (11).

17 Claims, 6 Drawing Sheets

ONION PEELING DEVICE

TECHNICAL FIELD

The present invention relates generally to a device for peeling onions.

BACKGROUND ART

The problem of peeling an onion and removing it hard skin is well known and several attempts to create a device that simplifies and speeds up the process have been done.

In U.S. Pat. No. 4,545,297 such a prior onion peeling device is disclosed. The device in U.S. Pat. No. 4,545,297 comprises two parts; one that holds the onion and one that cuts through the outer hard onion skin and that in the same time peels of the cut pieces of skin. It has been found that there are some problems with the prior device. For examples that the device is easily jammed by partly peeled onion skin.

SUMMARY OF INVENTION

An object of the present invention is to create an onion peeling device which generates a clear and complete cut through the outer onion skin and that in an effective way peels off the cut skin. The device shall also operate in a consequent and accurate way, using a method peeling onions quick and reliable. Further, the device shall be easy to use and to clean.

The object is met by an onion peeling device according to claim 1. The onion peeler of claim 1 comprises a first part adapted to hold an onion and a second part comprising a frame on which first and/or second arms are arranged around an opening. First free ends of the arms are pointing towards a centre axis of the opening and are radially moveable with respect to the centre axis of the opening. At least two first arms are provided with vertically arranged cutting means and at least two second arms are provided with peeling means. The cutting means protrudes from the first end of the respective first arm at least in a direction of an extension of the respective first arm and is provided with at least one cutting edge. The invention is characterized in that the cutting means has at least partly a disc shape with a certain diameter and its perimeter is acting as a cutting edge and is encircling the first end of the respective arm. This shape of the cutting means is providing a clean cut through a larger part of at least the outer skin of the onion and fully through the outermost onion layer over the whole double curved surface of the onion. A more complete cut of the skin simplifies the next peeling step.

The cutting edge is substantially parallel to the tangent of at least a part of the substantially spherical outer surface of the onion. Preferably, has the cutting means a cutting edge which is substantially parallel to the tangent of the entire substantially spherical outer surface of the onion. By arranging the cutting edge so that it is substantially parallel to a tangent of at least a part but preferably the entire surface of the onion, the cutting edge is able to follow the outer shape of the onion during the cutting step, i.e. when the second part with its first arms are pressed down over the onion.

In one embodiment of the invention the cutting edge of the cutting means is covering the perimeter defined by an angle of at least 180°. The cutting means can also be provided with a cutout formed in the cutting edge defining a sharp edge. If at least a semi circular cutting edge is used, the cut through the onion skin and layers is well defined and with a cutout in the edge, the edge is initially cut in the open end of at least a first layer of a pre cut second onion surface.

In another embodiment, the cutting means are arranged at the first end of each first arm where the first ends are having a substantially circular and vertically extending cross section with a diameter smaller than the diameter of the cutting means. Preferably the knife radius is approximately one and a half average onion layer larger than the first end radius. The difference in radius size ensures a concise and well defined depth of the cut in the onion surface, a cut reaching through at least the skin and the entire outermost layer of the onion.

In another embodiment, the peeling means has the shape of a hook and is adapted to intrude into a first onion surface cut in the end part of the onion and to peel off at least the skin and the outermost layer of the onion. The hook is adapted to intrude into the soft cut second onion surface at a radial distance from the centre of the cut onion surface gripping at least the outer most layer of the onion and the skin. By adjusting the dimensions of the arc shape of the arms so that they are resting on the upper cut part of the onion and giving the hook a certain protrusion length, the peeling means is self-regulating according to the size of the onion to be peeled and adapted to only catch the outer layer of the onion.

In a preferred embodiment the first arms provided with the cutting means are adapted to engage with the onion before the second arms provided with the peeling means engage with the onion. If the device first cut the skin and then peels it off, the peeling process is quick and reliable.

In another embodiment one second part is provided with cutting means and that a further second part, named third part, is provided with the peeling means. By using three parts jamming of the device can be prevented.

Preferably the third part is constructed similar to the second part, thus comprising a frame on which second arms are arranged around an opening. First free ends of the arms are pointing towards a centre axis of the opening and are radially moveable with respect to the centre axis of the opening. Further, at least two of the second arms are provided with the peeling means.

In one embodiment an elastic force is acting on the arms of the second and/or third parts, biasing their first ends towards each other. Due to the elastic force acting on the arms, the first ends of the arms are following the outer surface of the onion to be peeled.

In another embodiment the arms of the second and/or third parts are made pivotable around a pivot point arranged at a second end of the arms in a perimeter of the opening. This pivotal movement simplifies the movement of the arms when pressing the cutting and peeling second and/or third part over an essentially spherical onion.

In a further embodiment the arms of the second and/or third parts are arc shaped and so formed and mounted that a substantially half spherical space is formed enclosed by the arc shaped arms. The half spherical space is large enough to accommodate at least a top part of the onion and arms with an arc shape are more thoroughly following the surface of the onion and are also better aligning the cutting and peeling means over the onion.

In another embodiment the onion peeler comprising a first part and one or two second parts which are pivotably joined to each other by a linkage mounted to one first side of the parts. A pivotal movement of the main parts is a simple yet effective way to effectively and precisely create the cutting and peeling. The pivotally joined parts can also be easily separated, cleaned and stored.

In another embodiment the first part comprises a plate with a protruding shaft provided with a pointed end onto which the onion is placed. Preferably the protruding shaft is pivotable around a joint in the plate. This facilitates storage of the onion peeler since the shaft can be placed in a position parallel to the plate when not in use.

The invention also relates to an onion peeler according to a second embodiment. This second embodiment onion peeler is characterized in that it comprising a first part adapted to hold an onion, a second part comprising a frame on which first arms are arranged around a first opening, and a third part on which second arms are arranged around a second opening. The first free ends of the arms are pointing towards a centre axis of the first and second opening respectively and are radially moveable with respect to the respective centre axis. At least two of the first arms are provided with vertically arranged cutting means and at least two of the second arms are provided with peeling means. The cutting means are provided with at least one cutting edge and wherein the cutting means at least partly have a disc shape with a diameter with its perimeter acting as the cutting edge. When separating the parts performing the cutting and peeling the jamming of the parts can be prevented.

In a first embodiment of the second onion peeler, the cutting means protrudes from the first end of the respective first arm at least in a direction of an extension of the respective first arm and is provided with at least one cutting edge.

Please note that all the embodiments or features of an embodiment could be combined in any way if such combination is not clearly contradictory.

BRIEF DESCRIPTION OF DRAWINGS

The invention is now described, by way of example, with reference to the accompanying drawings, in which.

DESCRIPTION OF EMBODIMENTS

In the following, a detailed description of an onion peeler device according to the invention is disclosed in detail in respect of embodiments and in reference to the accompanying drawings. All examples herein should be seen as part of the general description and therefore possible to combine in any way in general terms. Again, individual features of the various embodiments may be combined or exchanged unless such combination or exchange is clearly contradictory to the overall function of the device.

Figure 1:
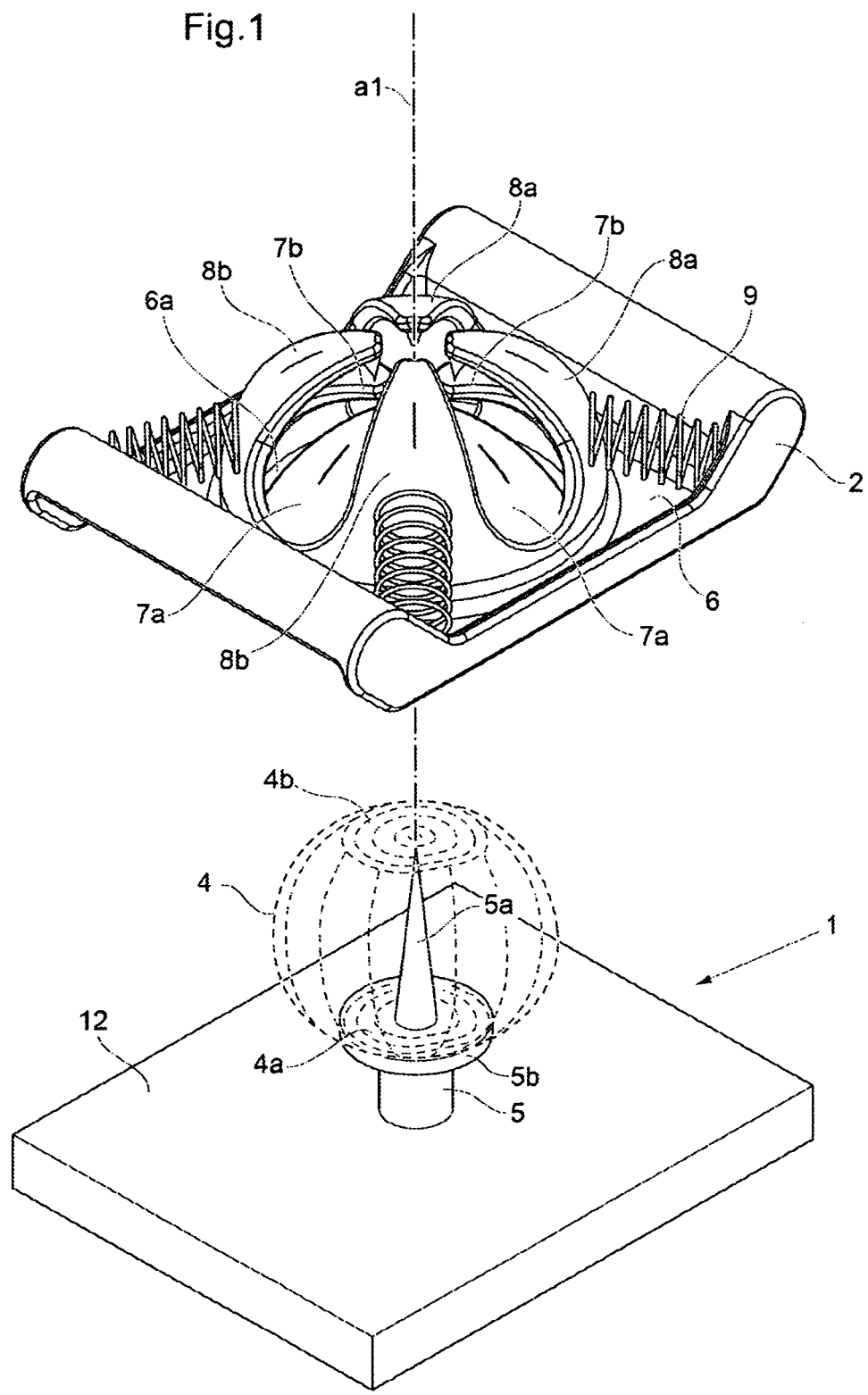
FIGS. 1 and 2 discloses an onion peeler according to a first embodiment of the invention, FIG. 3 discloses an arm with cutting means, FIG. 4 discloses an arm with peeling means, FIGS. 5 and 6 discloses an onion peeler according to a second embodiment of the invention, FIG. 7 discloses the first part of the onion peeler according to the second embodiment and FIG. 8 discloses the onion peeler according to the second embodiment in a fully closed position.
Figure 2:
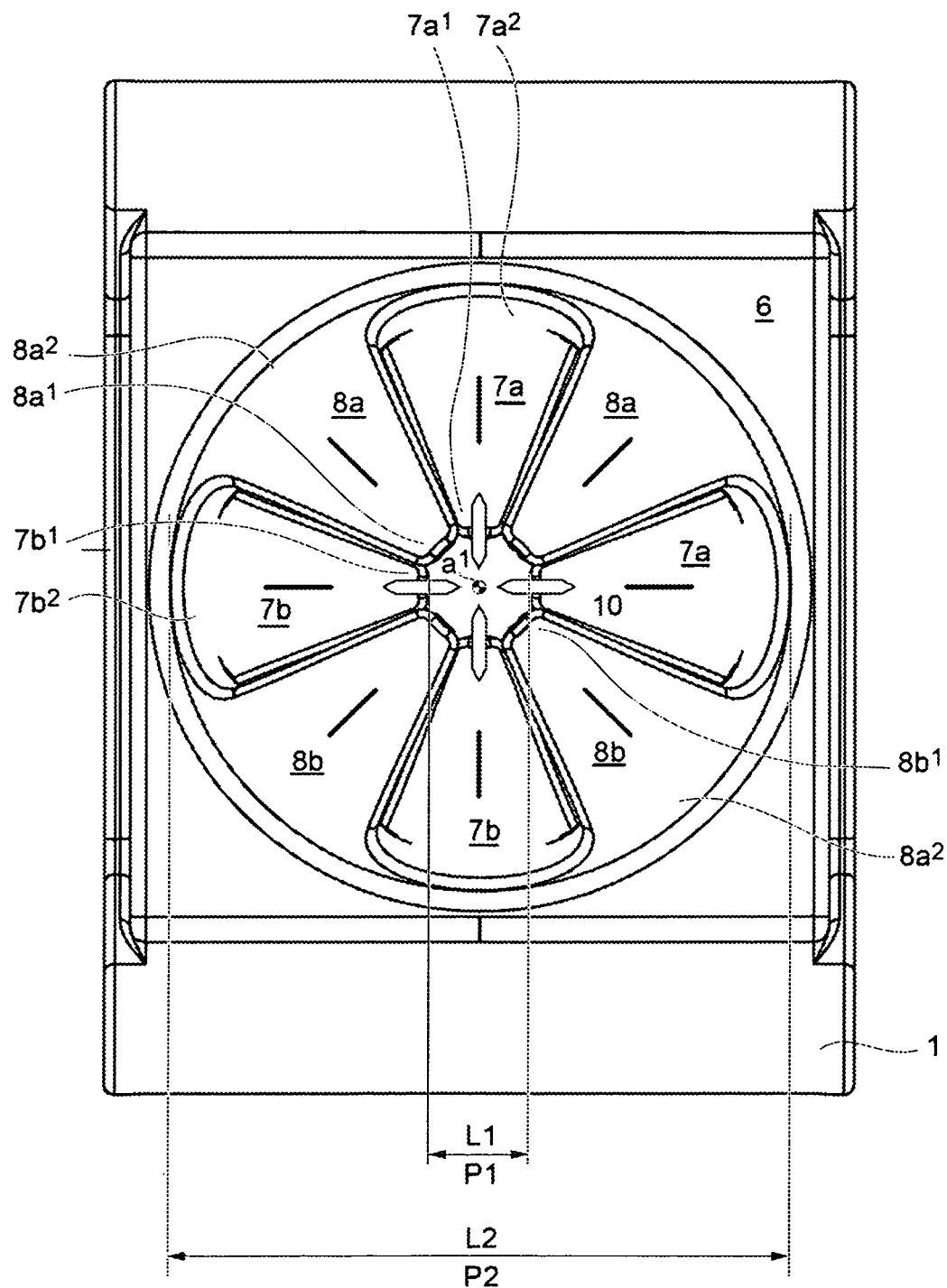

In FIGS. 1 and 2 a first embodiment of the onion peeler is disclosed. The peeler comprises a first and second main part 1, 2. The first part 1 is adapted to hold the onion 4 and the second part 2 is adapted to be pressed down over the onion in order to cut over the complete curved surface of the outer skin and to peel the hard outer skin and the outer most onion layer from the onion. The onion to be peeled is cut in both ends to remove the onion blossom. This exposes a first onion surface 4a and a second onion surface 4b where the layers of the onion and the outer hard skin are clearly visible.

The first part 1 comprises a plate 12 with a protruding shaft 5 provided with a pointed end 5a onto which the onion 4 is placed. When used, the pointed end 5a is placed substantially in the center of the first onion surface 4a. The onion 4 is pressed down over the end 5a until it reaches a flange part 5b on which the onion 4 comes to a final rest on its first onion surface 4a.

The second part 2 comprises a frame 6 on which at least four, but in the figure eight, first and second arms 7a, 7b; 8a, 8b are mounted around an opening 6a in the frame 6 with a, to the opening perpendicular, virtual center axis a1. The arms can be arc shaped and so formed and mounted that a substantially half spherical space is formed enclosed by the arc shaped arms 7a, 7b; 8a, 8b. The half spherical space is large enough to accommodate a top part of the onion 4 and the opening 6a in the frame has a diameter exceeding the diameter of a large onion 4.

The arms 7a, 7b; 8a, 8b have a first 7a1, 7b1; 8a1, 8b1 and a second end 7a2, 7b2; 8a2, 8b2 respectively. The first ends 7a1, 7b1; 8a1, 8b1 are pointing towards each other and towards the centre axis a1 of the opening 6a at a top area of the half spherical space and the second ends 7a2, 7b2; 8a2, 8b2 are in contact with the frame 6 at the edge of the opening 6a.

In FIG. 2 it is clear that the first ends 7a1, 7b1; 8a1, 8b1 are arranged separated from each other by a first distance $I_1$ predefined by a distance somewhat smaller the average size of a cut off area of an onion blossom. The first ends 7a1, 7b1; 8a1, 8b1 are radially moveable between a first position P1 defined by the first distance $I_1$ and a second position P2 defined by a second distance $I_2$, where the second distance $I_2$ is defined by the diameter of a large onion.

Preferably, the first ends 7a1, 7b1; 8a1, 8b1 have a vertically extending cross section S1 with an essentially circular shape and a diameter d1 and a radius r1. For a more detailed view of the first end of the arms see FIG. 3.

Of course are other type of arms are also possible, for example radially extending straight arms (not shown) flexible in the radial direction by use of for example a spring so that they are moveable between the first and second positions P1 and P2.

The arms 7a, 7b; 8a, 8b may be made of a flexible material, such as for example plastic, so that they allow an elastic movement of the first ends 7a1, 7b1; 8a1, 8b1 of the arms between the first and second position P1, P2. The elasticity of the material is creating a force acting on the arms 7a, 7b, 8a, 8b biasing their first ends 7a1, 7b1; 8a1, 8b1 towards each other and towards the first position P1.

The arms 7a, 7b, 8a, 8b may also be made of a rigid material, such as metal, and be made pivotable around a pivot point arranged at the second end 7a2, 7b2; 8a2, 8b2 of the arms. The pivotal movement is restrained between the first position P1 and the second position P2. One or more elastic force creating devices 9, such as for example separate springs of any suitable material acting on each arm or a rubber ring (not shown) enclosing all arms, are creating the force acting on the arms 7a, 7b, 8a, 8b biasing their first ends 7a1, 7b1; 8a1, 8b1 together towards each other and towards the first position P1. The force creating devices 9 also act as a resistance against movement of the arms 7a, 7b, 8a, 8b towards the second position P2 and thus keep the first ends 7a1, 7b1; 8a1, 8b1 of the arms in connection with the onion outer surface. Therefore, due to the elasticity of the arms 7a, 7b, 8a, 8b themselves or the force creating devices 9, the first ends of the arms 7a1, 7b1; 8a1, 8b1 are following the outer surface of the onion to be peeled.

On the first end 7a1, 7b1 of at least the first two 7a, 7b of the at least four arms a tool in the form of a cutting means 10 is mounted, respectively. The cutting means 10 protrudes from the first end 7a1, 7b1 of the respective first arm 7a, 7b at least in a direction of an extension of the respective first arm 7a, 7b and is provided with a cutting edge 11 substantially parallel to the tangent of at least a part of the substantially spherical outer surface of the onion.

Figure 3:
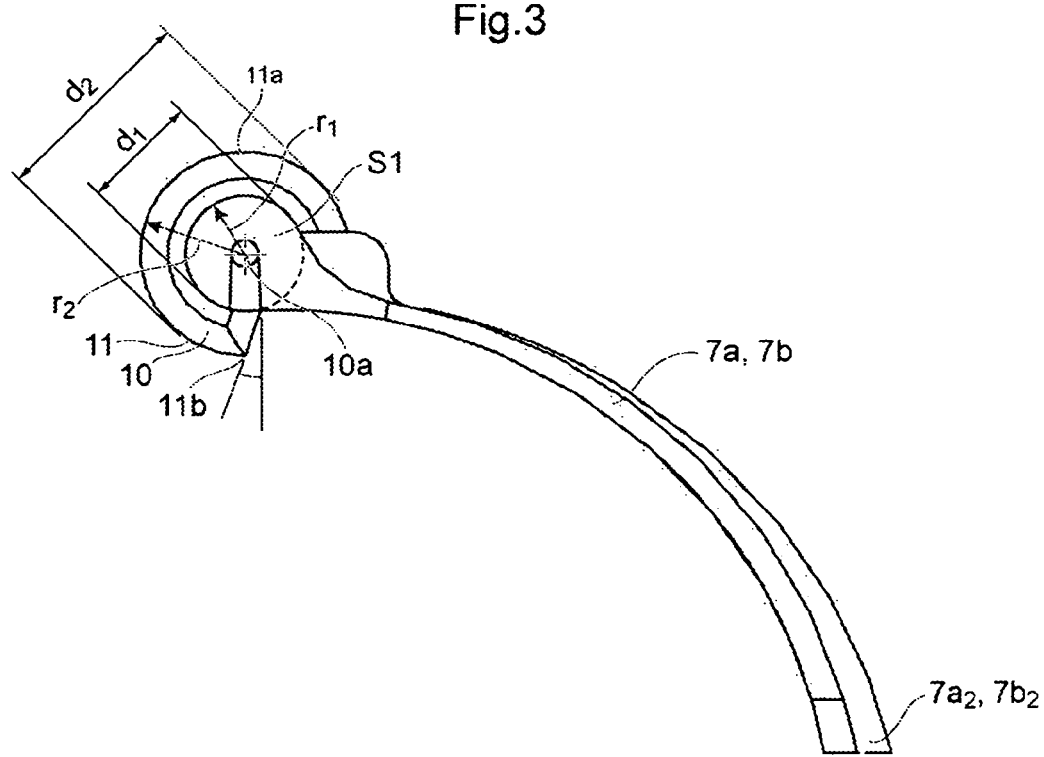

The cutting means 10 is preferably a cutting knife and is shown in more detail in FIG. 3. The cutting knife 10 has at least partly a disc shape with a diameter d2 and radius r2 and its perimeter sharpened and used as cutting edge 11. One knife 10 is arranged at the most outer part of the first end 7a1, 7b1 of each arm 7a, 7b with its center point 10a attached in the first end 7a1, 7b1 of the arms at a position substantially in the center of the circular cross section S1 of the first end so that the cutting edge 11 is encircling the end. The knife 10 may be press fitted, welded, glued, molded or in any other way attached to the first end 7a1, 7a2.

The diameter d2 of the circular cutting knife is larger than the diameter d1 of the cross section S1 of the first ends. Preferably the knife radius r2 is approximately one and a half average onion layer larger than the first end radius r1. The difference in radius size ensures a concise and well defined depth of the cut in the onion surface. That is a cut reaching through at least the skin and the entire outermost layer of the onion.

When the cutting knife has reached the lower part of the onion, i.e. when the knife has reached below the largest onion diameter, an upper partition 11a of the cutting edge 11 is cutting into the skin and through the outer layer of the onion. The cutting edge 11 is preferably covering the perimeter defined by an angle of at least 180°, preferably at least 315°. The cutting edge 11 is directed towards the onion surface so that the tangent of the onion surface to be cut is always substantially parallel to the tangent of the sharpened cutting edge 11.

This shape and placement of the cutting knife 10, creates when in operation, a cut through the outer skin and fully through the outer most layer over the whole double curved surface of the onion.

In order for the knife 10 to initially cut down in the pre cut second onion surface 4b, a cutout may be formed in the cutting edge 11 defining a sharp edge 11b. The sharp edge 11b has preferably an angle λ of between 20° and 45° with reference to the cut first onion surface 4a.

Figure 4:
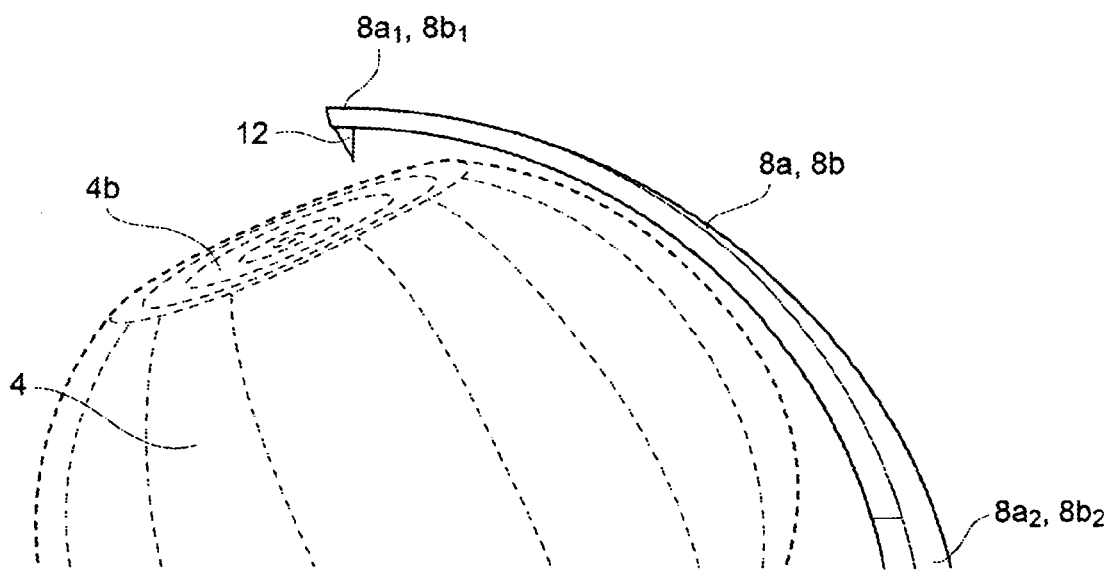

On the first end 8a1, 8b1 of at least the two second arms 8a, 8b of the at least four arms 7a, 7b; 8a, 8b, a tool in the form of a peeling means 12 is mounted, respectively. See FIG. 4. The peeling means 12 has the shape of one or several hooks and is adapted to intrude into the soft cut second onion surface 4b at a radial distance from the centre of the cut onion surface 4b gripping at least the outer layer of the onion 4. By adjusting the dimensions of the arc shape of the arms 8a, 8b so that they are resting on the upper cut part 4b of the onion and giving the hook a certain protrusion length, the peeling means 12 is self-regulating and adapted to only catch the outer layer of the onion. When the second part is pressed down over the onion, the outer layer of the onion is caught and the tangential force from the arms is separating and prying apart the layers. Thus, the hard skin and the outer most soft layer are torn off the onion in the respective pre cut pieces.

The first arms 7a, 7b provided with the cutting means 10 are adapted to engage with the onion 4 before the second arms 8a, 8b provided with the peeling means 12 engage with the onion 4. In the first embodiment of the onion peeler shown in figure and 2, the first arms 7a, 7b provided with the cutting means 10 are arranged below the second arms 8a, 8b provided with the peeling means 12, i.e. in the half spherical space created by the second arms 8a, 8b.

The first and the second main parts 1, 2 can in one, not shown, embodiment be pivotably joined to each other by a linkage 13 mounted to one first side of the parts. They can also be two separate parts which are used together by aligning and pressing down the second part 2 over the first part 1, as shown in FIG. 1.

Figure 5:
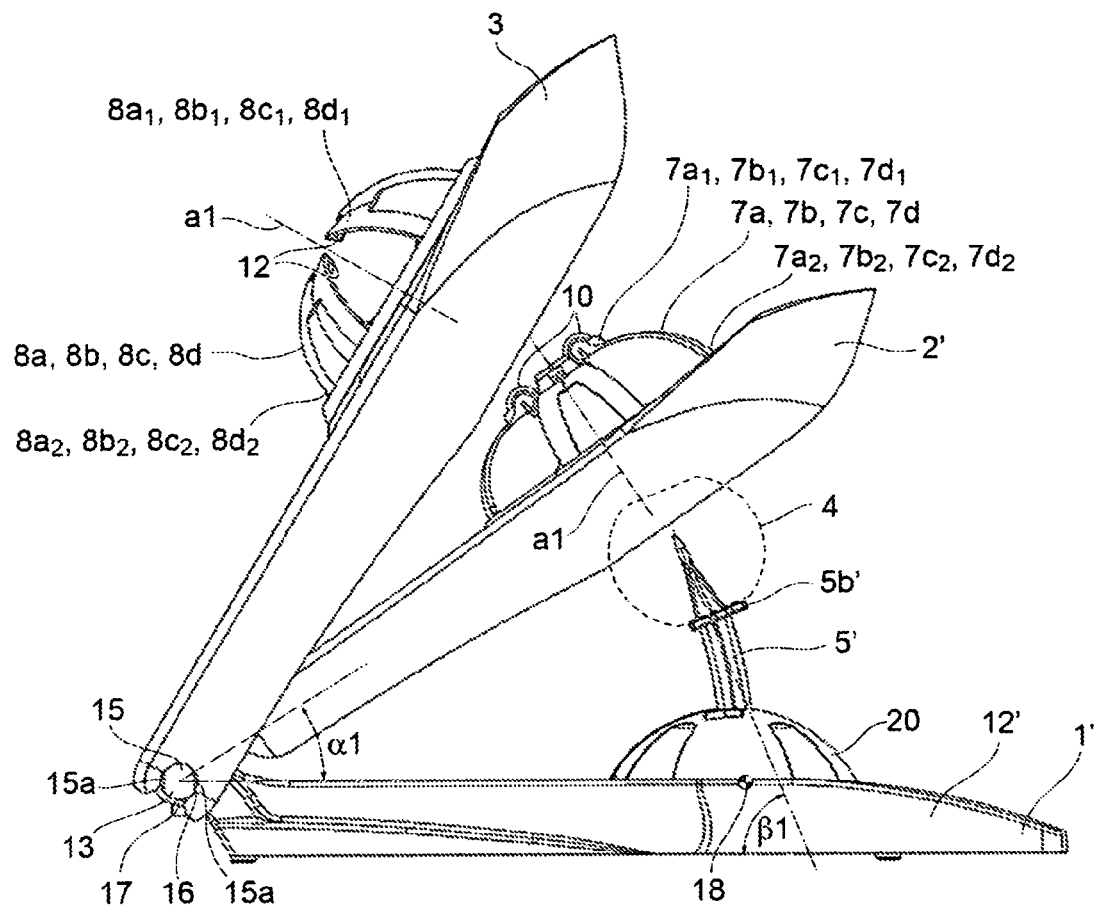
Figure 6:
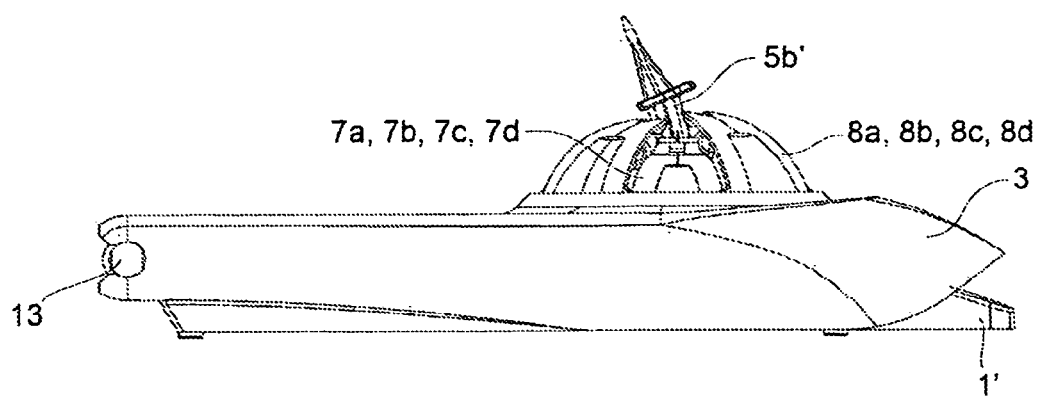
Figure 7:
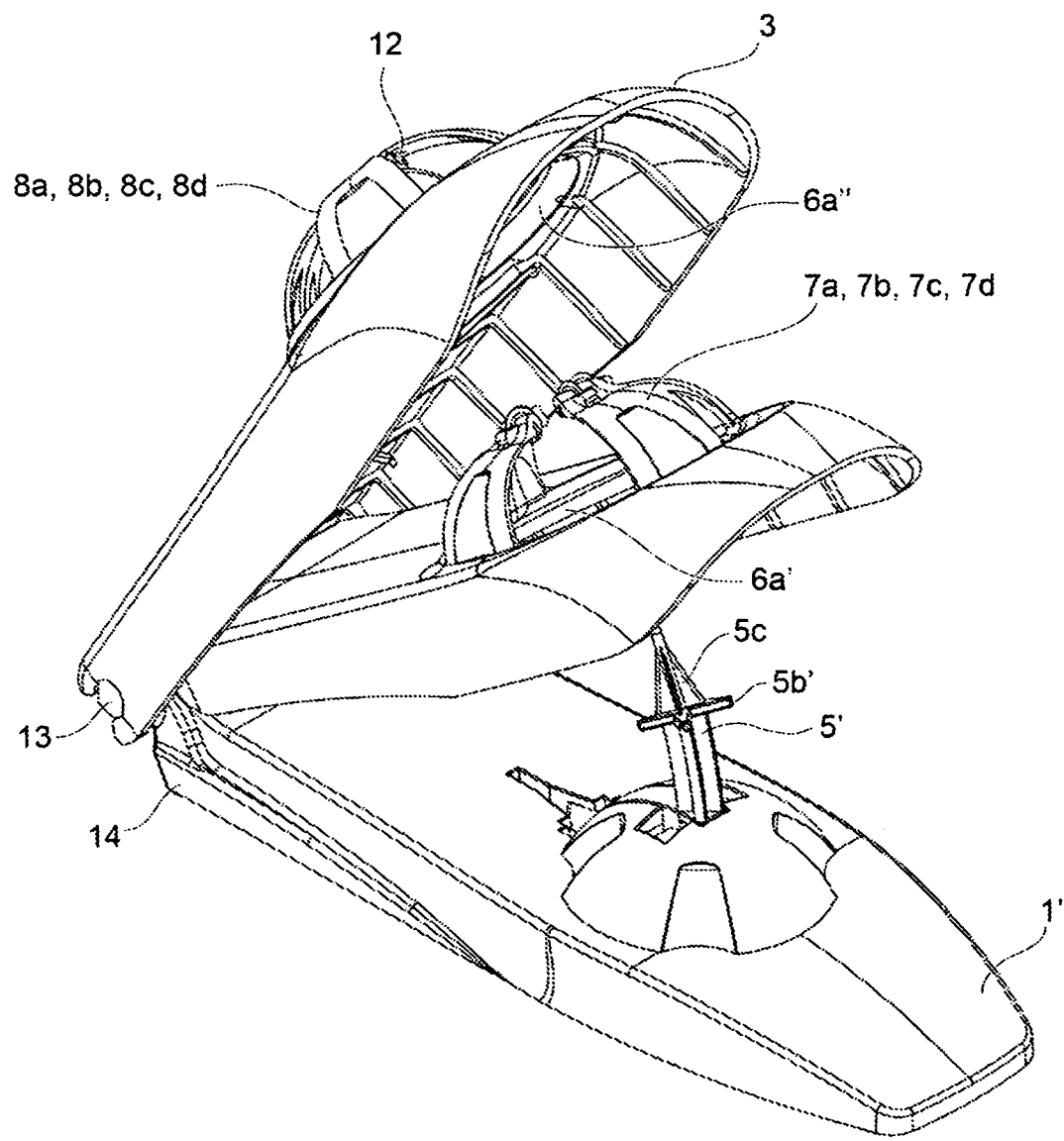

In FIGS. 5, 6 and 7 a second embodiment of the onion peeler is disclosed. The peeler comprises a first 1 and two second parts 2, where the cutting means have been separated from the peeling means. We call them a second and third main part 2', 3. The first part 1' is adapted to hold the onion, the second part 2' is adapted to cut over the complete curved surface of the outer skin and the third part 3 is adapted to peel the outer skin from onion. The three parts 1', 2', 3 are pivotably joined to each other in one end 14.

When used, the second part 2' is firstly pressed down towards the first plate 1' cutting diametrical cuts in the outer layer of the onion. Then the third part 3 is pressed down towards the first part 1' and now also the second part 2', catching the outer layer of the onion and peeling off the hard skin. The cutting and peeling process starts at a certain start angle α1 between the first part 1' and the second 2' and the third part 3. This angle α1 is defined by where the onion is placed in relation to the first part 1'.

The first part 1', the second part 2' and the third part 3 are preferably pivotably connected with each other by means of a linkage comprising at least one hinge 13, preferably two coaxial hinges 13, one at each end corner 14. See also FIGS. 7 and 8. The axis of the hinge 13 is provided in the onion peeler transversally to the extension length of the parts 1', 2', 3. In such an embodiment, the protruding shaft 5' of the first part 1' is preferably provided closer to the free end of the peeler than the hinged end of the peeler.

In the preferred embodiment the first part 1' is designed to be placed on a table or any other horizontal, vertical or other base and thus can the second and third part 2', 3 when in use perform a swinging movement down towards the first part 1'. It is also possible that the first part 1' with the onion 4 performs the swinging movement.

The hinge or hinges 13 are preferably dismountable. One of the advantages is that the peeling device will be easier to clean. In a preferred embodiment of the hinges 13 the first part 1' is provided with taps 15 (can also be seen in FIG. 8), two at each corner 14, coaxially oriented transversally to the extension length of the parts 1', 2', 3. The taps 15 have a circular cross section that is cut at opposite sides in a vertical direction when the first part 1' is placed on a horizontal surface. The cuttings give the taps 15 two opposite, vertical, planar faces 15a.

The second and third part 2', 3 are respectively provided with cooperating recesses 16 that take up the taps 15 inside. The recess 16 is preferably a hole and it is provided with an opening 17 towards the end of the second and third part 2', 3. The width of the opening 17 corresponds to the width between the planar faces 15a of the taps 15 so that the taps 15 can be inserted through the opening 17 when the second and third parts 2', 3 respectively are in the position in relation to the first part 1' that the planar faces 15a of the taps 15 are in line with the opening 17. In the shown embodiment it is when the second and third part 2', 3 are in an open, completely vertical position.

The opening 17 must be narrower than the diameter of the taps 15. In that way the first, second and third parts 1', 2', 3 can only be dismounted in one position and will not fall apart in unwanted situations. Of course it is possible that the recess 16, i.e. the hole and opening 17 are covered or not through going.

Figure 8:
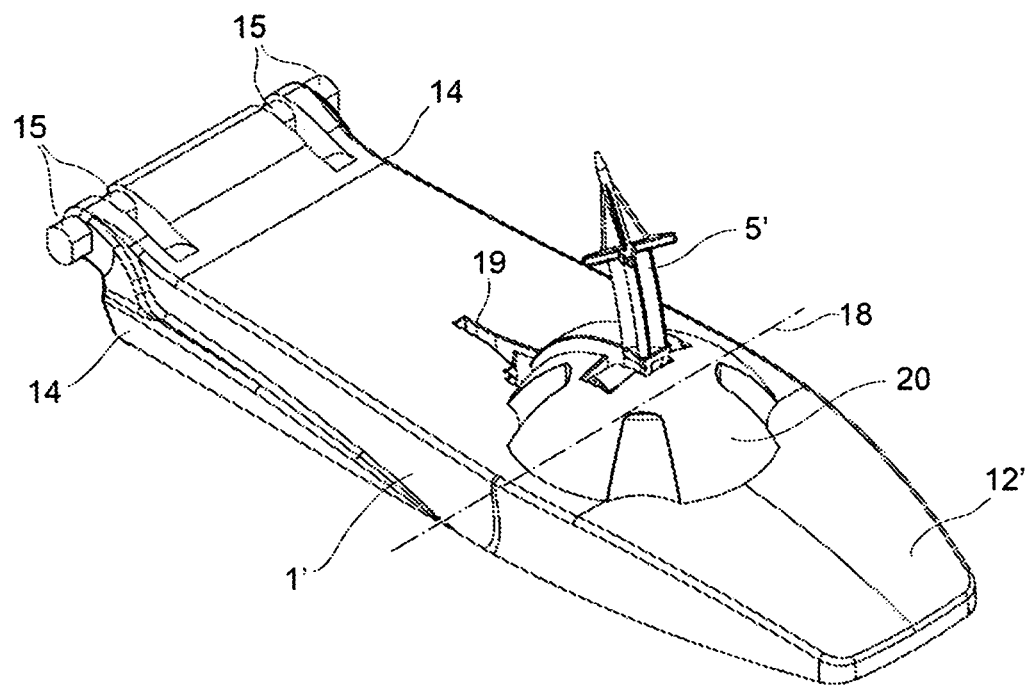

In FIG. 8 the first part 1' is shown, comprising a first plate 12' with a protruding shaft 5' provided with a pointed end 5a' onto which the onion 4 is placed and pressed down until it is in a final position resting on a flange part 5b'. The protruding shaft is in one embodiment pivotable around a joint defined by an axis 18 in the plate 12'. This facilitates storage of the onion peeler since the shaft 5' can be placed in a position parallel to the plate 12' when not in use. Preferably it is placed in a cut out 19 in plate 12'. The half sphere 20 protruding from the plate 12' is supporting the shaft 5' and defining its upper most position.

In order to compensate for the circular motion around the pivot linkage 13 the shaft 5' has in its protruded operational position a shaft angle β1 of less than 90° to the first plate 12'. Preferably the shaft angle β1 is related to the start angle α1 so that the onion 4 is cut and peeled substantially perpendicular to the cut first and second onion surface 4a, 4b. The shaft 5' may also have a curved shape to even further compensate the circular motion of the parts.

The first second part 2' and the second part, named third part 3, comprises a frame 6', 6" on which at least two, but preferably four or more, arc shaped first and second arms 7a, 7b, 7c, 7d; 8a, 8b, 8c, 8d are mounted around an opening 6a', 6a" in the frame 6', 6". The arms are so formed and mounted that a substantially half spherical space is formed enclosed by the arc shaped arms 7a, 7b, 7c, 7d; 8a, 8b, 8c, 8d. The half spherical space is large enough to accommodate at least a top part of the onion 4 and the opening 6a', 6a" in the frame has a diameter exceeding the diameter of a large onion 4.

Arms 7a, 7b, 7c, 7d; 8a, 8b, 8c, 8d have first 7a1, 7b1; 7c1, 7d1; 8a1, 8b1; 8c1, 8d1 and second ends 7a2, 7b2, 7c2, 7d2; 8a2, 8b2; 8c2, 8d2 respectively. The first ends 7a1, 7b1; 7c1, 7d1; 8a1, 8b1; 8c1, 8d1 are pointing towards each other and a centre axis a1 at a top area of the half spherical space and the second ends 7a2, 7b2, 7c2, 7d2; 8a2, 8b2; 8c2, 8d2 are in contact with the frame 6', 6" in the edge of the opening 6a', 6a'''. The first and second arms 7a, 7b, 7c, 7d; 8a, 8b, 8c, 8d are preferably constructed almost similar to the arms disclosed in embodiment 1 in FIG. 1-4. Due to the separated cutting and peeling steps, a difference is present in which tool that is arranged in the first ends of the first 7a, 7b, 7c, 7d and second arms 8a, 8b, 8c, 8d of the respective second and third part 2', 3.

On the second part 2' in the embodiment of FIG. 5-7 the tool in the form of a cutting means 10 or knife is mounted. The cutting means 10 is mounted in the first end 7a1, 7b1, 7c1, 7d1 of at the at least two first arms 7a, 7b, 7c, 7d respectively. The cutting means 10 has preferably the same design as described in the explanation of FIG. 3.

The onion holding protruding shaft 5', the first arms 7a, 7b, 7c, 7d and cuffing means 10 are so constructed that the knife 10 only cut in the onion during its operation and not in any other part of the device. Preferably the protruding shaft 5' and the flange part 5b' are provided with cut outs 5c in which the each knife respectively is adapted to run during the pressing down operation. To prevent the knives from cutting into the shaft 5', the protruding shaft 5' and the flange part 5b' may also have a diameter smaller than the first distance $I_1$. This construction keeps the knife edges sharp during a longer period of time.

On the third part 3 in the embodiment of FIG. 5-7 the tool in the form of a peeling means 12 is mounted on the second arms 8a, 8b, 8c, 8d. The peeling means 12 has the shape of one or several hooks and is preferably designed as described above and in FIG. 4.

In FIG. 6 the fully closed position is shown where the first, second and third parts are substantially parallel to each other. The protruding pin 5' is visible in the opening 6', 6". When in storage position the protruding pin is preferably down folded to accommodate less space.

The numbers of arms 7a, 7b, 7c, 7d; 8a, 8b, 8c, 8d arranged on the second and thirds parts are at least two but preferably four. However, more than four arms are also possible. It is preferable that the number of arms is equal on both parts 2', 3. Further, the first arms performing the cutting operation 7a, 7b, 7c, 7d and the second arms performing the peeling operation 8a, 8b, 8c, 8d are alternating and are displaced in relation to each other with an angle corresponding to the number of and to the width of the arms. This so that the peeling device can get a firm grip of the outer layer of the onion at an area separated from the cut slot or an area in vicinity of the slot.

It is also to be noted that in FIGS. 4-7 the onion peeling device is symmetrical around its extension length axis.

The material in all the parts comprised in the onion peeling device according to all embodiments can be plastic, metal or other material with a specific hardness, suitable for being in contact with food.

When this second embodiment of an onion peeler is used the following steps are implemented:

Pivoting the second and the third part 2', 3 around the hinge 13 so that the first part 1' is exposed.

Folding up the shaft 5' in the first plate 1' until it has reached a protruding position.

Placing the onion 4 on the protruding shaft 5'.

Folding down the second part 2' and pressing it over the onion until it is substantially parallel to the first part.

In this step the disc shaped knife 10 is cutting through the outer layer and hard skin of the onion around the entire diameter of the onion still covered with its hard skin.

Folding down the third part 3 and pressing it down over the onion.

In this step the peeling means 12 in the form of a hook are intruding into the first cut onion surface 4b, catching only the outermost layer of the onion. When the third part 3 is pressed down over the onion the outermost layer and the skin of the onion is peeled off.

Removing the now peeled onion 4 from the shaft 5'.

The invention claimed is:

1. Onion peeler adapted to peel off the outer skin of an onion comprising a first part adapted to hold the onion and at least one second part comprising a frame on which first and/or second arms are arranged around an opening, first free ends of the arms are pointing towards a center axis of the opening and are radially movable with respect to the center axis of the opening and where at least two first arms are provided with vertically arranged cutting means and at least two second arms are provided with peeling means and wherein the cutting means protrudes from the first end of the respective first arm at least in a direction of an extension of the respective first arm wherein the cutting means are provided with at least one cutting edge and wherein the cutting means have at least partly a disc shape with a diameter and a perimeter, the perimeter acting as the at least one cutting edge; and wherein the first part and the second part are pivotably joined to each other by a linkage mounted to one first side of the parts.

2. Onion peeler according to claim 1, wherein the cutting edge of the cutting means is covering the perimeter defined by an angle of at least 180°.

3. Onion peeler according to claim 1, wherein the cutting means is at least partly encircling the first end of the respective arm.

4. Onion peeler according to claim 1, wherein the cutting means is provided with a cutout formed in the cutting edge defining a sharp edge.

5. Onion peeler according to claim 1, wherein the first ends of the first arms have a substantially circular and vertically extending cross section with a diameter smaller than the diameter of the cutting means.

6. Onion peeler according to claim 1, wherein the peeling means has the shape of at least one hook and is adapted to intrude into a first onion surface, to cut in the end part of the onion and to peel off at least the skin and an outermost layer of the onion.

7. Onion peeler according to claim 1, wherein the first arms provided with the cutting means are adapted to engage with the onion before the second arms provided with the peeling means engage with the onion.

8. Onion peeler according to claim 1, wherein one second part is provided with cutting means and that a third part is provided with the peeling means.

9. Onion peeler according to claim 8, wherein the third part comprises a frame on which second arms are arranged around an opening, first free ends of the second arms are pointing towards a center axis of the opening and are radially movable with respect to the center axis of the opening and at least two of the second arms are provided with the peeling means.

10. Onion peeler according to claim 1, wherein an elastic force is acting on the arms of the second and/or third parts biasing their first ends towards each other.

11. Onion peeler according to claim 8, wherein the arms of the second and/or third parts are made pivotable around a pivot point arranged at a second end of the arms in a perimeter of the opening.

12. Onion peeler according to claim 8, wherein the arms of the second and/or third parts are arc shaped and so formed and mounted that a substantially half spherical space is formed enclosed by the arc shaped arms.

13. Onion peeler according to claim 1, wherein the first part comprises a plate with a protruding shaft provided with a pointed end onto which the onion is placed.

14. Onion peeler according to claim 13, wherein the protruding shaft is pivotable around a joint in the plate.

15. Onion peeler adapted to peel off the outer skin of an onion comprising a first part adapted to hold the onion and at least one second part comprising a frame on which first and/or second arms are arranged around an opening, first free ends of the arms are pointing towards a center axis of the opening and are radially movable with respect to the center axis of the opening and wherein at least two first arms are provided with vertically arranged cutting means and at least two second arms are provided with peeling means and wherein the cutting means protrudes from the first end of the respective first arm at least in a direction of an extension of the respective first arm, wherein the cutting means are provided with at least one cutting edge and wherein the cutting means have at least partly a disc shape with a diameter and a perimeter, the perimeter acting as the at least one cutting edge; and wherein the cutting means is provided with a cutout formed in the at least one cutting edge defining a sharp edge.

16. Onion peeler adapted to peel off the outer skin of an onion comprising a first part adapted to hold the onion and at least one second part comprising a frame on which first and/or second arms are arranged around an opening, first free ends of the arms are pointing towards a center axis of the opening and are radially movable with respect to the center axis of the opening and wherein at least two first arms are provided with vertically arranged cutting means and at least two second arms are provided with peeling means and wherein the cutting means protrudes from the first end of the respective first arm at least in a direction of an extension of the respective first arm, wherein the cutting means are provided with at least one cutting edge and wherein the cutting means have at least partly a disc shape with a diameter and a perimeter, the perimeter acting as the at least one cutting edge; and wherein the peeling means has the shape of at least one hook and is adapted to intrude into a first onion surface, to cut in the end part of the onion and to peel off at least the skin and an outermost layer of the onion.

17. Onion peeler adapted to peel off the outer skin of an onion comprising a first part adapted to hold the onion and at least one second part comprising a frame on which first and/or second arms are arranged around an opening, first free ends of the arms are pointing towards a center axis of the opening and are radially movable with respect to the center axis of the opening and wherein at least two first arms are provided with vertically arranged cutting means and at least two second arms are provided with peeling means and wherein the cutting means protrudes from the first end of the respective first arm at least in a direction of an extension of the respective first arm, wherein the cutting means are provided with at least one cutting edge and wherein the cutting means have at least partly a disc shape with a diameter and a perimeter, the perimeter acting as the at least one cutting edge; and wherein the first part comprises a plate with a protruding shaft provided with a pointed end onto which the onion is placed.

* * * * *